(12) United States Patent
Nagasawa

(10) Patent No.: US 6,278,567 B1
(45) Date of Patent: Aug. 21, 2001

(54) APPARATUS AND METHOD FOR RECORDING A VIDEO SIGNAL ON A RECORDING MEDIUM

(75) Inventor: Fumihiro Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/260,269

(22) Filed: Jun. 14, 1994

(30) Foreign Application Priority Data

Jun. 17, 1993 (JP) .................................................. 5-146505

(51) Int. Cl.$^7$ .............................. G11B 5/09; H04N 9/89; H04N 5/95
(52) U.S. Cl. ................................. 360/51; 368/13; 368/85
(58) Field of Search .................................. 360/27, 39, 51, 360/36.2, 36.1; 358/339, 337; 386/12, 13, 48, 85, 84

(56) References Cited

U.S. PATENT DOCUMENTS

| | | | |
|---|---|---|---|
| 4,649,438 | * 3/1987 | Shimizu et al. ..................... | 358/337 |
| 4,916,553 | * 4/1990 | Yoshioka et al. .................... | 360/36.2 |
| 5,212,600 | * 5/1993 | Kanota .................................. | 358/339 |
| 5,293,274 | * 3/1994 | Yamada ............................... | 360/36.2 |

\* cited by examiner

*Primary Examiner*—Regina Y. Neal
(74) *Attorney, Agent, or Firm*—Frommer Lawrence & Haug, LLP.; William S. Frommer

(57) ABSTRACT

A video signal recording apparatus for recording a video signal on a recording medium comprises a memory for temporarily memorizing the video signal, a synchronizing separating circuit for separating a synchronizing signal from the video signal, a write control signal generating circuit for generating a write control signal used to write the video signal in the memory in response to the synchronizing signal from the synchronizing separating circuit, a recording circuit connected to the memory for recording the video signal read out from the memory on the recording medium, a timing signal generator for generating a timing signal relating to a driving state of the recording medium, and a read control signal generating circuit for generating a read control signal used to read the video signal memorized in the memory on the basis of the timing signal.

10 Claims, 4 Drawing Sheets

APPARATUS AND METHOD FOR RECORDING A VIDEO SIGNAL ON A RECORDING MEDIUM

BACKGROUND OF THE INVENTION

1. Field of the Invention

The present invention relates to a data recording apparatus for use with data recording apparatus, such as a single-unit video camera-recorder, a video tape recorder, a magneto-optical disk apparatus, a hard disk apparatus or the like, for example.

2. Description of the Related Art

There is known a single-unit video camera-recorder in which a camera section and a video tape recorder (VTR) section are formed as one body to record a video signal obtained from the camera section on a recording medium, such as a magnetic tape or the like.

In the single-unit video camera-recorder, light of an object obtained from an optical system is radiated on an image pickup screen of a CCD (charge-coupled device), and that light is photoelectrically converted by the CCD to an electrical signal. A video signal is obtained by reading the electrical signal by a read-out circuit or the like. The video signal is processed by a signal processing system in some proper signal processing, such as a gamma correction and a white balance adjustment or the like. Then, the video signal is processed by a recording system in a variety of signal processing for recording and supplied through a recording amplifier to a magnetic head mounted on a rotary drum. The magnetic head records the video signal on a magnetic tape so as to form oblique tracks.

When the video signal from the camera section is recorded, the single-unit video camera-recorder uses a clock signal generated from a read-out circuit used to read a video signal or a recording clock signal locked to an external clock signal. Portable VTRs, for example, separate a synchronizing (sync) signal from an input video signal and effect various processing to record the video signal by the clock signal obtained on the basis of the separated synchronizing signal.

Since the single-unit video camera-recorder uses the recording clock signal locked to the input sign al, if a rotational speed of a rotary drum is fluctuated when the single-unit video camera-recorder is vibrated or shocked in use, there is then the disadvantage that the video signal cannot be recorded on the magnetic tape with a correct magnetic track pattern.

Specifically, if the rotational speed of the rotary drum is increased, then a magnetic track pattern is increased in length. Also, if the rotational speed of the rotary drum is decreased, then the magnetic track pattern is reduced in length. consequently, the video signal cannot be recorded on the magnetic tape normally. If the rotational speed of the rotary drum is fluctuated so that the video signal cannot be recorded on the magnetic tape normally, then the magnetic track pattern is fluctuated, which causes a so-called mistracking upon reproduction. As a consequence, the video signal cannot be reproduced from the magnetic tape normally.

If portable recording apparatus represented by the single-unit video camera-recorder, such as a portable VTR (connected to the camera and carried in user's waist in use) and a variety of recording apparatus using a hard disk and a magneto-optical disk as a recording medium to record information on the recording medium by rotating the recording medium are vibrated or shocked, there is then the disadvantage that the video signal cannot be recorded on the recording medium normally.

SUMMARY OF THE INVENTION

In view of the aforesaid aspect, it is an object of the present invention to provide a data recording apparatus which can normally record data even when vibrated or shocked.

According to an aspect of the present invention, there is provided a video signal recording apparatus for recording a video signal on a recording medium which is comprised of a memory for temporarily memorizing the video signal, a synchronizing separating circuit for separating a synchronizing signal from the video signal, a write control signal generating circuit for generating a write control signal used to write the video signal in the memory in response to the synchronizing signal from the synchronizing separating circuit, a recording circuit connected to the memory for recording the video signal read out from the memory on the recording medium, a timing signal generator for generating a timing signal relating to a driving state of the recording medium, and a read control signal generating circuit for generating a read control signal used to read the video signal memorized in the memory on the basis of the timing signal.

DETAILED DESCRIPTION OF THE PREFERRED EMBODIMENT

A data recording apparatus according to an embodiment of the present invention will hereinafter be described with reference to FIG. 1.

Figure 1:
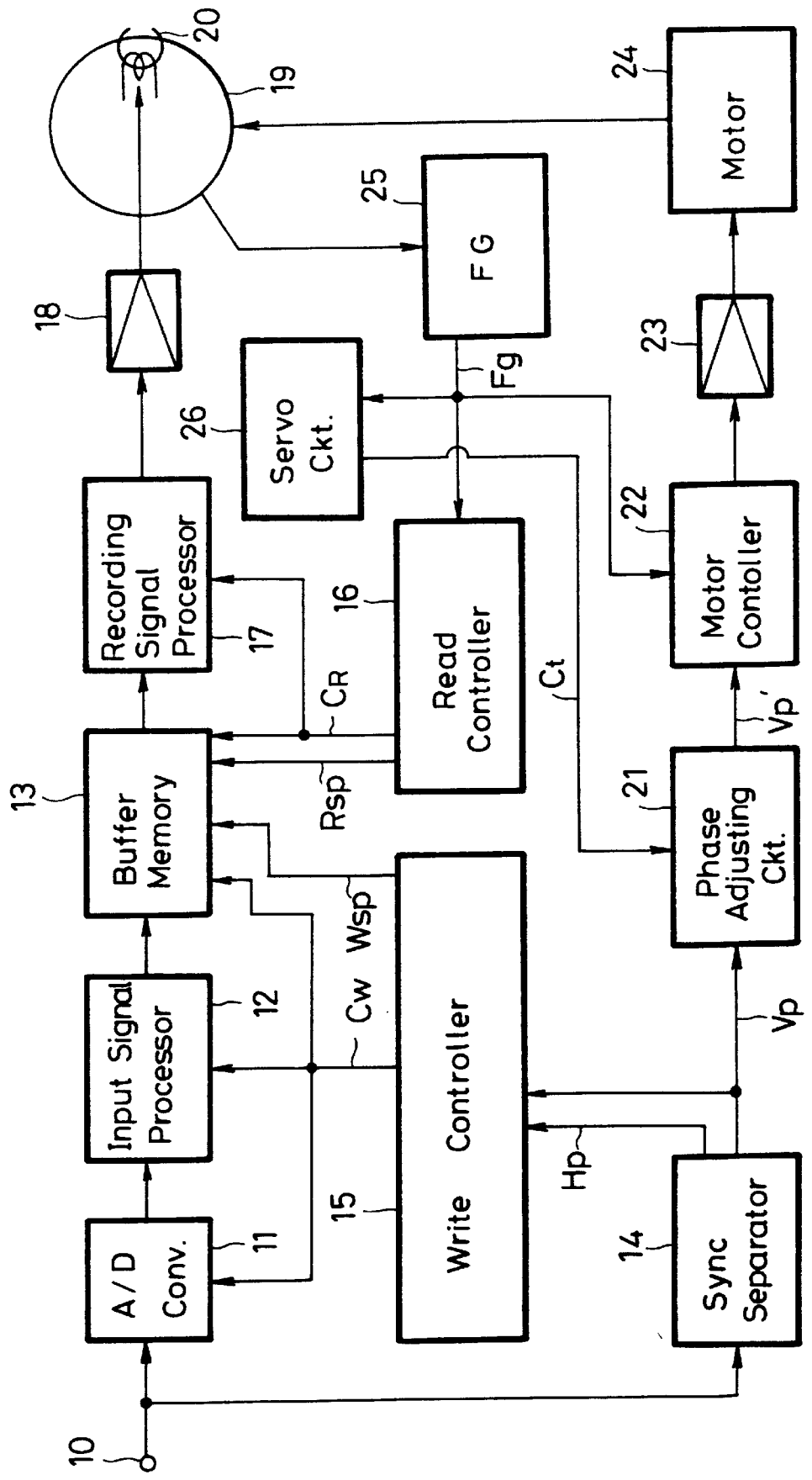
FIG. 1 is a block diagram showing a video signal recording apparatus according to an embodiment of the present invention.

As shown in FIG. 1, there is provided an input terminal 10 to which there is supplied any one of analog video signals of an output of a camera section of a single-unit video camera-recorder, an output of a camera of the portable VTR or a video signal of other video signal generating source or the like.

The analog video signal applied to the input terminal 10 is supplied to an analog-to-digital (A/D) converter 11 and a synchronizing (sync) separator 14. The A/D converter 11 converts the analog video signal supplied thereto to a digital video signal and supplies the converted digital video signal to an input signal processor 12. The input signal processor 12 processes the digital video signal supplied thereto from the A/D converter 11 in some suitable processing fashion, such as compression coding, addition of error correction code. Further, the input signal processor 12 processes the digital video signal supplied thereto in various signal processing fashions if the format of the digital video signal is different. In VTRs in which a digital video signal is not compressed, the digital video signal is shuffled. An output of the input signal processor 12 is supplied to and memorized in a buffer memory 13.

The sync. separator 14 separates a synchronizing signal from the video signal supplied thereto from the input terminal 10 and supplies the separated synchronizing signal to a write controller 15 and a phase adjusting circuit 21. The write controller 15 supplies a clock signal $C_W$ to the A/D converter 11, the input signal processor 12 and the buffer memory 13. The A/D converter 11 converts the analog video signal to the digital video signal in response to the clock signal $C_W$ supplied thereto. The input signal processor 12 operates in response to the clock signal $C_W$ supplied thereto to effect a desired signal processing on the digital video signal. The buffer memory 13 memorizes the digital video signal in its desired area in response to the clock signal $C_W$ and a write start signal $W_{sp}$ supplied thereto.

The digital video signal memorized in the buffer memory 13 is read out from the buffer memory 13 in response to a read start signal $R_{SP}$ and a clock signal $C_R$ supplied thereto from a read controller 16. The read controller 16 supplies the clock signal $C_R$ generated in response to a frequency signal Fg from a frequency signal generator 25 to a recording signal processor 17. The recording signal processor 17 processes the digital video signal read out from the buffer memory 13 in a desired manner and supplies a processed digital video signal to a recording amplifier 18. Having amplified the digital video signal supplied thereto, the recording amplifier 18 supplies the amplified digital video signal through a rotary transformer (not shown) to a magnetic head 20 mounted on a rotary drum 19.

The frequency signal generator 25 generates a frequency signal Fg which becomes a pulse per revolution of the rotary drum 19 or the frequency signal Fg which forms a plurality of pulses per revolution of the rotary drum 19. Therefore, the read controller 16 includes a PLL (phase locked loop) which is based on such frequency signal Fg.

The frequency signal Fg from the frequency signal generator 25 is also supplied to a servo circuit 26 and a motor controller 22. The servo circuit 26 generates a control signal Ct on the basis of the frequency signal Fg supplied thereto and supplies the control signal Ct to a phase adjusting circuit 21. The phase adjusting circuit 21 phase-adjusts a vertical synchronizing signal $V_P$ supplied thereto from the sync. separator 14 by a time equal to a delay amount provided by the input signal processor 12 and the recording signal processor 17 on the basis of the control signal Ct supplied thereto from the servo circuit 26. An output of the phase adjusting circuit 21, i.e., a vertical synchronizing signal $V_P$' thus phase-adjusted is supplied to the motor controller 22.

The motor controller 22 obtains a drive signal on the basis of the frequency signal Fg supplied thereto from the frequency signal generator 25 and the vertical synchronizing signal $V_P$' from the phase adjusting circuit 21, and supplies the drive signal through a driver 23 to a motor 24. Then, the motor 24 is driven by the drive signal from the driver 23 and transmits a drive power to the rotary drum 19 to rotate the rotary drum 19. Therefore, the video signal supplied to the magnetic head 20 is recorded on a magnetic tape (not shown) so as to form slant tracks on the magnetic tape.

Figure 2:
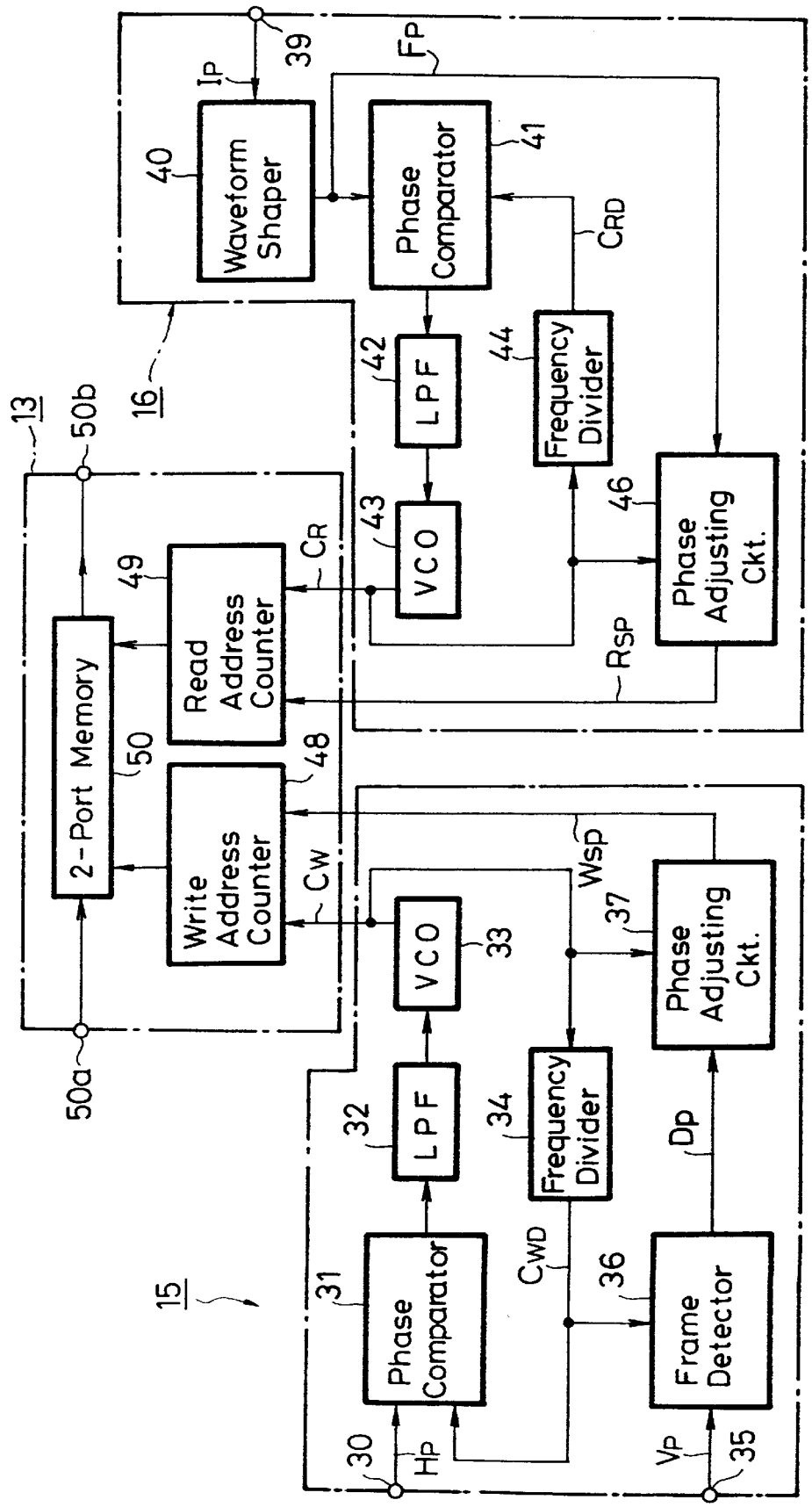
FIG. 2 is a block diagram showing a main portion of the video signal recording apparatus according to the embodiment of the present invention.

A main portion of the video signal recording apparatus shown in FIG. 1 will be described with reference to FIG. 2. In FIG. 2, reference numeral 13 depicts the buffer memory 13 shown in FIG. 1, reference numeral 15 depicts the write controller 15 shown in FIG. 1, and reference numeral 16 depicts the read controller 16 shown in FIG. 1.

As shown in FIG. 2, a horizontal synchronizing signal $H_P$ from the sync. separator 14 shown in FIG. 1 is supplied to an input terminal 30. The horizontal synchronizing signal $H_P$ is supplied from the input terminal 30 to a phase comparator 31. The phase comparator 31 phase-compares the horizontal synchronizing signal $H_P$ and a frequency-divided signal $C_{WD}$ from a frequency divider 34 which will be described later on. The phase comparator 31 supplies a compared result through a low-pass filter (LPF) 32 to a voltage controlled oscillator (VCO) 33.

The voltage controlled oscillator 33 generates a clock signal $C_W$ having a frequency based on the output voltage from the low-pass filter 32. Then, the voltage controlled oscillator 33 supplies the clock signal $C_W$ to a write address counter 48 of the buffer memory 13, the frequency divider 34 and the phase adjusting circuit 37. The frequency divider 34 obtains the frequency-divided signal $C_{WD}$ by dividing the clock signal $C_W$ supplied thereto from the voltage controlled oscillator 33 and supplies the same to the phase comparator 31.

The vertical synchronizing signal $V_P$ from the sync. separator 14 shown in FIG. 1 is supplied to an input terminal 35. The vertical synchronizing signal $V_P$ supplied through the input terminal 35 is supplied to a frame detector 36. The frame detector 36 detects a leading portion of the frame on the basis of the vertical synchronizing signal $V_P$ and the frequency-divided signal $C_{WD}$ from the frequency divider 34. Specifically, according to this embodiment, the frame detector 36 detects the starting position of the odd-numbered field and supplies a detected result to the phase adjusting circuit 37 as a pulse signal $D_P$. The phase adjusting circuit 37 obtains a write start signal $W_{SP}$ on the basis of the clock signal $C_W$ supplied thereto from the voltage controlled oscillator 33 and the pulse signal $D_P$ supplied thereto from the frame detector 36. Then, the phase adjusting circuit 37 supplies the write starting signal $W_{SP}$ to a write address counter 48.

Figure 5:
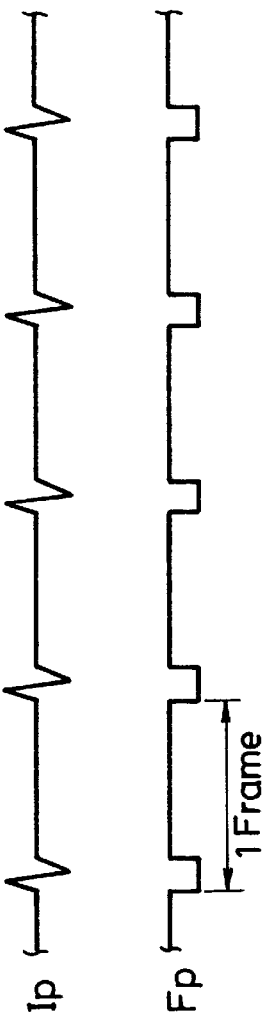
FIG. 5 is a timing chart showing input and output of a waveform shaper according to the embodiment of the present invention.

Specifically, the write controller 15 obtains the clock signal $C_W$ on the basis of the horizontal synchronizing signal $H_P$ supplied thereto from the PLL (not shown) and also obtains the write start signal $W_{SP}$ which results from phase-adjusting the frame detection signal $D_P$ obtained from the frame detector 36. The write controller 15 supplies both the clock signal $C_W$ and the write start signal $W_{SP}$ to the address counter 48. Therefore, the digital video signal in which the delay time generated by the input signal processor 12 is compensated is memorized in the buffer memory 13, The write controller 15 will be described more fully with reference to FIGS. 3 to 5.

Figure 3:
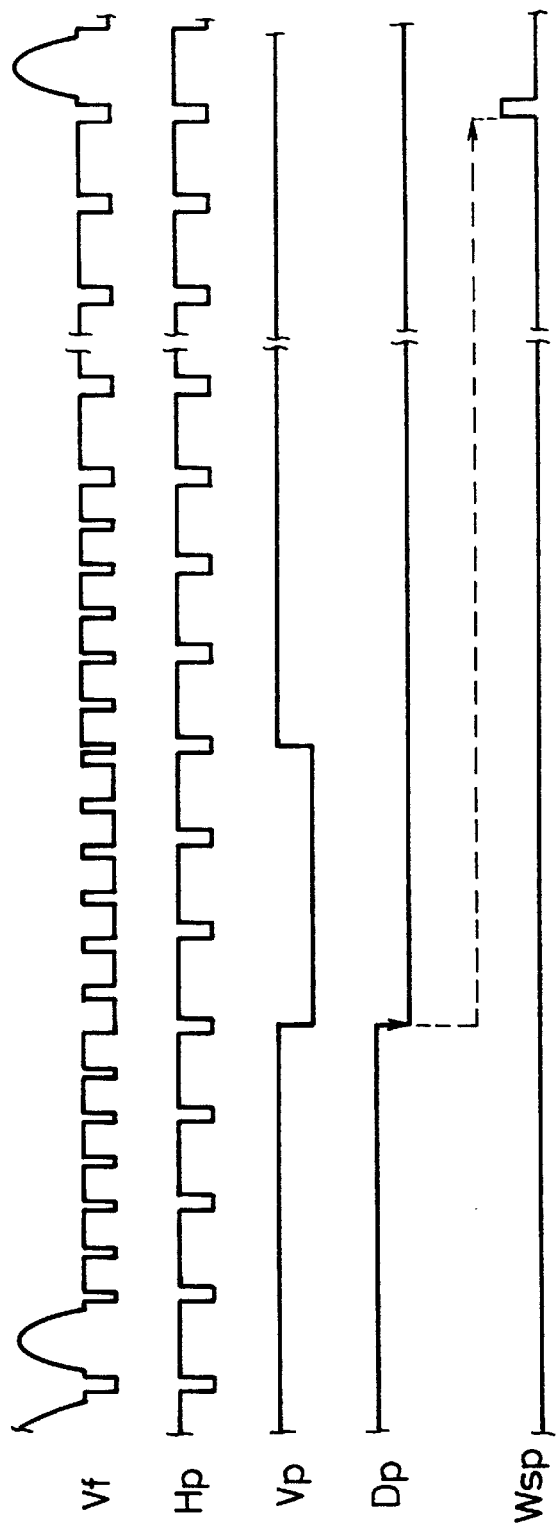
FIG. 3 is a timing chart showing a write timing according to the embodiment of the present invention.

As shown in FIG. 3, a video signal Vf is supplied through an input terminal 50a to the buffer memory 13 shown in FIG. 2, the horizontal synchronizing signal $H_P$ is supplied to the phase comparator 31 and the vertical synchronizing signal $V_P$ is supplied to the frame detector 36, respectively.

The frequency divider 34 obtains the frequency-divided signal $C_{WD}$ by dividing the clock signal $C_W$ supplied thereto from the voltage controlled oscillator 33. Then, the frequency divider 34 supplies the frequency-divided signal $C_{WD}$ to the phase comparator 31. The phase comparator 31 compares the frequency-divided signal $C_{WD}$ and the horizontal synchronizing signal $H_P$ supplied thereto through the input terminal 30 and supplies a compared output to the low-pass filter (LPF) 32.

The frequency-divided signal $C_{WD}$ from the frequency divider 34 is also supplied to the frame detector 36. The frame detector 36 obtains the frame detection signal $D_P$ shown in FIG. 3 from the vertical synchronizing signal $V_P$ and the frequency-divided signal $C_{WD}$ by effectively utilizing the fact that the odd-numbered field and the even-numbered field are displaced from each other in timing by a ½ horizontal scanning period. The frame detection signal $D_P$ is held at low level in the odd-numbered field and is held at high level in the even-numbered field. The phase adjusting circuit 37 counts the pulses of the clock signal $C_W$ from a timing point at which the frame detection signal changes from high to low level. Then, the phase adjusting circuit 37 outputs the write start signal $W_{SP}$ of high level when it counts a predetermined number of the pulses of the clock signal $C_W$. The write start signal $W_{SP}$ is supplied to the write address counter 48.

According to the embodiment of the present invention, when counting the clock signal $C_W$ 20 times, the phase adjusting circuit 37 outputs the write start signal $W_{SP}$. That is, a period ranging from the trailing edge of the frame detection signal $D_P$ to the leading edge of the write start signal $W_{SP}$ as shown by a dashed line in FIG. 3 is equivalent to the delay time in the input signal processor 12.

Referring back to FIG. 2, the buffer memory 13 comprises a 2-port memory 50, the write address counter 48 and a read address counter 49. Specifically, the digital video signal supplied from the input signal processor 12 shown in FIG. 1 through an input terminal 50a is memorized in the 2-port memory 50 by the write address signal supplied thereto from the write address counter 48. Data memorized in the 2-port memory 50 is read out from the 2-port memory 50 by the read address signal from the read address counter 49. The data thus read out from the 2-port memory 50 is outputted through an output terminal 50b and then supplied to the recording signal processor 17 shown in FIG. 1.

The frequency signal $I_P$ (or $F_g$) from the frequency signal generator 25 (FIG. 1) is supplied to an input terminal 39 as shown in FIG. 2. The frequency signal $I_P$ is supplied through the input terminal 39 to a waveform shaper 40. The waveform shaper 40 generates a frame pulse signal $F_P$ (FIG. 5) by waveform-shaping the frequency signal $I_P$, and supplies the frame pulse signal $F_P$ to the phase comparator 41. The phase comparator 41 phase-compares the frame pulse signal $F_P$ supplied thereto from the waveform shaper 40 and the frequency-divided signal $C_{RD}$ supplied thereto from a frequency divider 44 which will be described later on. The phase comparator 41 supplies the compared result through a low-pass filter (LPF) 42 to a voltage controlled oscillator 43.

The voltage controlled oscillator 43 generates a clock signal $C_R$ having a frequency based on the output voltage from the low-pass filter 42. Then, the voltage controlled oscillator 43 supplies the clock signal $C_R$ to the read address counter 49 of the buffer memory 13, the frequency divider 44 and a phase adjusting circuit 46. The frequency divider 44 obtains the frequency-divided signal $C_{RD}$ by dividing the clock signal $C_{RD}$, and supplies the frequency-divided signal $C_{RD}$ to the phase comparator 41.

The waveform-shaped signal generated from the waveform shaper 40, i.e., the frame pulse signal $F_P$ is supplied to the phase adjusting circuit 46. The phase adjusting circuit 46 obtains the read start signal $R_{SP}$ on the basis of the clock signal $C_R$ and the frame pulse signal $F_P$ and supplies the read start signal $R_{SP}$ to the read address counter 49.

Specifically, the read controller 16 obtains the clocks signal $C_R$ and the read start signal $R_{SP}$ on the basis of the frame detected signal $D_P$ by the PLL. Then, the read controller 16 supplies the clock signal $C_R$ and the read start signal $R_{SP}$ to the read address counter 49, whereby a timing is adjusted in such a manner that the writing of the digital video signal in the buffer memory 13 is ahead of the reading.

The writing operation in the buffer memory 13 and the reading operation from the buffer memory 13 in the video signal recording apparatus shown in FIGS. 1 and 2 will be described below with reference to FIG. 4.

Figure 4:
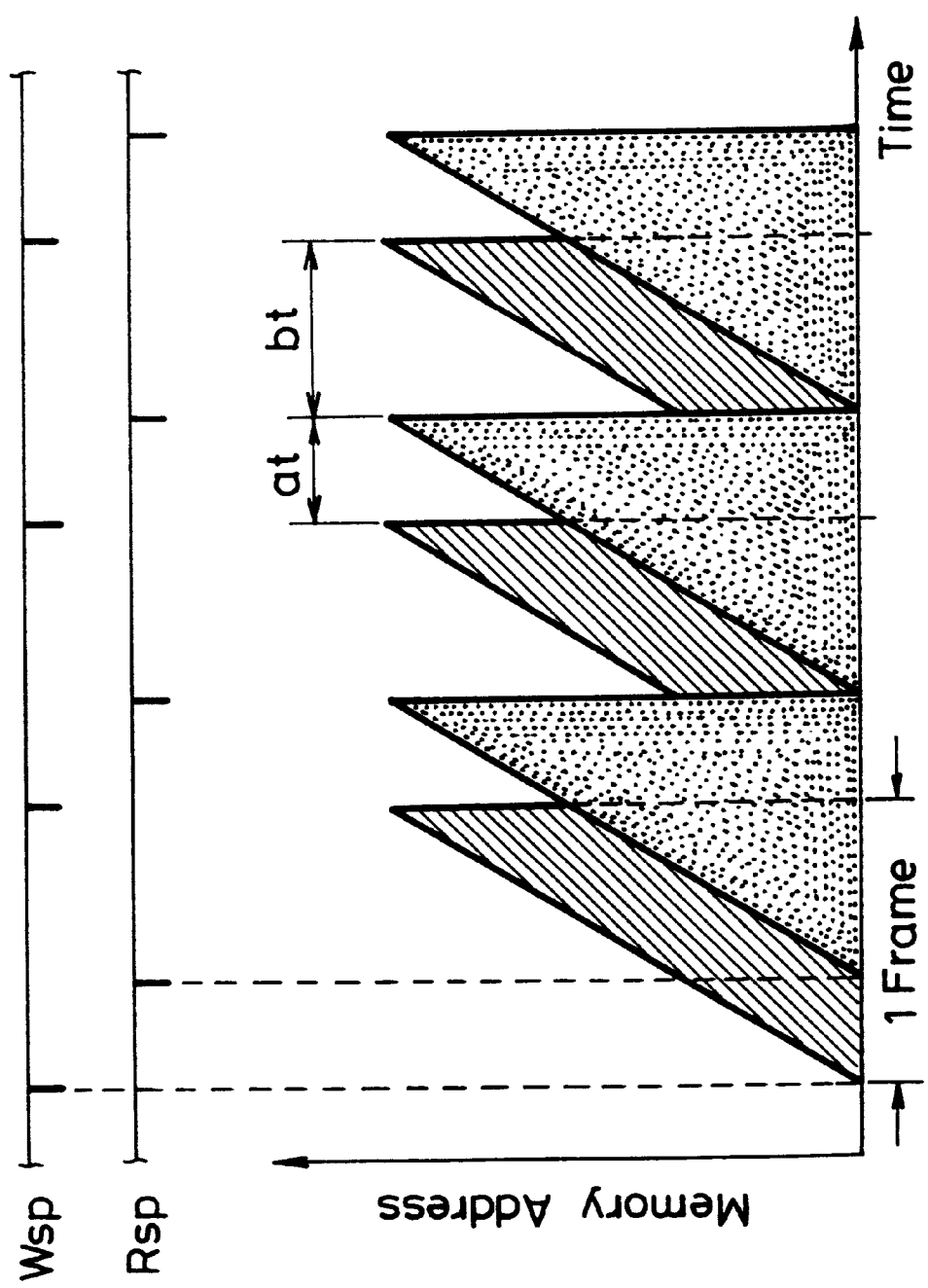
FIG. 4 is a graph used to explain a relationship between a memory address and a time according to the embodiment of the present invention.

In the graph of FIG. 4, the vertical axis indicates a memory address, the horizontal axis indicates a time, hatched areas indicate write addresses, and dotted areas indicate read addresses. Further, in FIG. 4, reference symbols at and bt depict drum rotation fluctuation correction ranges. For simplicity, it is assumed that one scanning is carried out in one frame.

As shown in FIG. 1, when the analog video signal from a video camera (not shown) or a signal generating source (not shown) is supplied through the input terminal 10 to the A/D converter 11, the analog video signal is converted by the A/D converter 11 to the digital video signal, and then supplied to the input signal processor 12. The digital video signal is processed by the input signal processor 12 in some suitable processing fashions, such as a compression, addition of error correction code or the like. Then, the digital video signal thus processed is supplied through the input terminal 50a to the 2-port memory 50 as shown in FIG. 2.

The clock signal $C_R$ and the write start signal $W_{SP}$ from the write controller 15 are supplied to the write address counter 48. Thus, the write address counter 48 generates a write address signal, and supplies the same to the 2-port memory 50. Video data supplied to the 2-port memory 50 through the input terminal 50a is memorized in the 2-port memory 50.

The clock signal $C_R$ and the read start signal $R_{SP}$ from the read controller 16 are supplied to the read address counter 49, whereby the read address counter 49 generates the read address signal and supplies the same to the 2-port memory 50.

When the read address signal is supplied to the 2-port memory 50, video data memorized in the 2-port memory 50 is read out from the 2-port memory 50 sequentially. The write timing and the read timing will be described with reference to FIG. 4. As shown in FIG. 4, when the write start signal $W_{SP}$ goes to logic low "0" level, the writing of video data is started. The areas shown hatched in FIG. 4 indicate write addresses. As shown in FIG. 4, the memory address is incremented progressively. Then, when the read start signal $R_{sp}$ goes to logic low "0" level, the reading of video data is started. Areas shown dotted in FIG. 4 indicate the read addresses. Study of FIG. 4 reveals that, although the write start timing and the read start timing are displaced from each other, the writing operation and the reading operation are overlapped each other from a time standpoint.

Specifically, video data is sequentially written in the buffer memory 13 in synchronism with the write start signal $W_{SP}$ and video data is sequentially read out from the buffer memory 13 in synchronism with the read start signal $R_{SP}$. At that time, the periods at and bt are the drum rotation fluctuation correction ranges. As shown in FIG. 2, when video data is written in the buffer memory 13, the phase of the write start signal $W_{SP}$ is matched with the phase of the video data inputted to the buffer memory 13 by phase-adjusting the clock signal $C_W$ obtained on the basis of the horizontal synchronizing signal $H_P$ and the frame detection signal $D_P$ obtained by the frame detector 36. When video data is read out from the buffer memory 13, the writing is advanced from the reading by phase-adjusting the read clock signal obtained on the basis of the frame pulse signal $F_P$ which results from waveform-shaping the frequency signal $I_P$ representing the rotary frequency of the rotary drum 19 from the frequency signal generator 25 and the frame pulse signal $F_P$ from the waveform shaper 40.

Therefore, if the rotational speed of the rotary drum 19 is fluctuated when the rotary drum 19 is vibrated or shocked, then the frequency signal generator 25 outputs the frequency signal $I_P$ corresponding to the change of the rotational speed of the rotary drum 19, and the frequency signal $I_P$ from the frequency signal generator 25 is waveform-shaped by the waveform shaper 40. The clock signal $C_R$ is obtained on the basis of the frame pulse signal $F_P$ from the waveform shaper 40. Since on the other hand the writing is advanced from the reading by phase-adjusting the frame pulse signal $F_P$ from the waveform shaper 40 by the phase adjusting circuit 46, the clock signal $C_R$ required when video data is read out from the buffer memory 13 becomes synchronized with the frequency signal representative of the rotary frequency of the rotary drum 19. Therefore, upon recording, predetermined tracks can be formed on the magnetic tape.

In actual practice, the rotational fluctuation of the rotary drum 19 is very small as compared with the drum rotation fluctuation correction ranges at and bt shown in the graph of FIG. 3.

As described above, according to the embodiment of the present invention, the frequency signal generator 25 generates the frequency signal $I_P$ representative of the rotary frequency of the rotary drum 19. The clock signal $C_R$ is generated on the basis of the frequency signal $I_P$ and the frame data is detected by the frame detection signal $F_P$ which results from waveform-shaping the frequency signal $I_P$. Then, since the clock signal from the voltage controlled oscillator 44 forming the PLL is phase-adjusted on the basis of the frame detection signal $F_P$ and the phase-adjusted output signal is used as the read start signal, it is possible to satisfactorily form recording tracks on the recording medium even when the rotary drum 19 is shocked or vibrated. Therefore, a satisfactory reproduced picture can be obtained upon playback.

While the present invention is applied to the single-unit video camera-recorder or the portable VTR as described above, the present invention is not limited thereto and may be applied to the hard disk apparatus and the magneto-optical disk apparatus with similar effects being achieved. If the mechanical portion of the hard disk apparatus and the magneto-optical disk apparatus for rotating the hard disk and the magneto-optical disk provided as the recording medium corresponds to the rotary drum 19 (FIG. 1) and the clock signal $C_R$ and the read start signal $R_{SP}$ are generated on the basis of the frequency signal outputted in response to the rotation of the rotary drum 19, then video data can be recorded on the recording medium accurately. It is therefore possible to prevent an error from occurring upon playback. While one scanning is carried out in one frame as described above, the present invention is not limited thereto and six scannings, for example, may be carried out in one frame with similar effects being achieved. If one scanning is carried out in one field, then the clock signal $C_W$ and the frame detection signal $D_P$ may be phase-adjusted even in the even-numbered field and the write start signal $W_{SP}$ may be outputted.

According to the present invention, information to be recorded is memorized in the memory means by the control signal from the write control means. The information memorized in the memory means is read out from the memory means by the control signal generated by the read control means on the basis of the pulse generated from the pulse generating means. The recording means is driven by the driving means, and the information read out from the memory means is recorded by the recording means on the recording medium. Therefore, even when the body equipment is vibrated or shocked, video data can be recorded on the recording medium satisfactorily.

Further, according to the present invention, since the information read out from the memory means is recorded on the recording medium by the apparatus in which the magnetic head is mounted on the rotary drum or the apparatus having the mechanism for holding the recording medium and the recording head for recording information on the recording medium thus held, the aforesaid effects can be achieved and also it is possible to satisfactorily record video data by all sorts of recording apparatus for forming tracks on the recording medium upon recording, such as the single-unit video camera-recorder, the VTR, the hard disk apparatus and the magneto-optical disk apparatus.

Furthermore, according to the present invention, since the pulse generating means generates the frequency signal indicative of the rotary frequency of the rotary drum and the read control means generates the control signal used to read information from the memory means on the basis of the frequency signal, the aforesaid effects can be achieved and it is possible to obtain the recording apparatus in which accurate tracks can be formed on the recording medium in a simple processing and with the simple circuit arrangement.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A video signal recording apparatus for recording a video signal on a recording medium, comprising:

memory means for storing said video signal at a time in accordance with a write control signal;

synchronizing separating means for separating a synchronizing signal from said video signal;

write control signal generating means for generating said write control signal in response to said synchronizing signal;

recording means for recording said video signal read out from said memory means on said recording medium;

timing signal generating means for generating a timing signal relating to a driving state of said recording means; and read control signal generating means for generating only from said timing signal a read control signal used to read said video signal stored in said memory means at a time synchronized with said timing signal.

2. The video signal recording apparatus according to claim 1, wherein said recording means is formed of a rotary drum having a magnetic head and said recording medium is formed of a magnetic tape.

3. The video signal recording apparatus according to claim 1, wherein said write control signal generating means includes a first clock signal generating circuit for generating a first clock signal used to write said video signal in said memory means on the basis of said synchronizing signal, a first detection signal generating circuit for generating a first detection signal at every predetermined period of said video signal on the basis of said synchronizing signal, and a first phase adjusting circuit for generating a write start signal used to start the supply of said first clock signal to said memory means by adjusting a phase of said first detection signal.

4. The video signal recording apparatus according to claim 3, wherein said read control signal generating means includes a second clock signal generating circuit for generating a second clock signal used to read said video signal out of said memory means on the basis of said timing signal, a second detection signal generating circuit for generating a second detection signal at every predetermined period of said video signal on the basis of said timing signal and a second phase adjusting circuit for generating a read start signal used to start the supply of said second clock signal to said memory means by adjusting a phase of said second detection signal.

5. The video signal recording apparatus according to claim 4, wherein said first clock signal generating circuit generates said first clock signal on the basis of a horizontal synchronizing signal, and said first detection signal generating circuit generates said first detection signal every one frame period of said video signal on the basis of a vertical synchronizing signal.

6. The video signal recording apparatus according to claim 5, wherein said recording means is formed of a rotary drum having a magnetic head, said recording medium is formed of a magnetic tape, and said timing signal generating means outputs a signal corresponding to a rotary frequency of said rotary drum as said timing signal.

7. The video signal recording apparatus according to claim 6, wherein said second detection signal generating circuit includes a waveform shaping circuit for outputting a waveform-shaped signal by waveform-shaping said timing signal, said second clock signal generating circuit generates said second clock signal on the basis of said waveform-shaped signal, and said second phase adjusting circuit generates said read start signal by adjusting a phase of said waveform-shaped signal.

8. The video signal recording apparatus according to claim 7, further comprising an input signal processing circuit connected to said memory means for processing said video signal in a predetermined signal processing fashion, and a third phase adjusting circuit for delaying said synchronizing signal by a delay time generated in said input signal processing circuit.

9. The video signal recording apparatus according to claim 8, wherein said second phase adjusting circuit phase-adjusts said waveform-shaped signal so that a writing of said video signal in said memory means is ahead of a reading of said video signal from said memory means.

10. Method of recording a video signal on a recording medium, comprising the steps of:

separating a synchronizing signal from said video signal;

generating a write control signal in response to said synchronizing signal;

storing said video signal in a memory in accordance with said write control signal;

generating a timing signal relating to a driving state of a recording circuit;

generating a read control signal only from said timing signal;

reading said video signal stored in said memory at a time synchronized with said read control signal; and recording by said recording circuit said video signal read out from said memory.

\* \* \* \* \*